US011869003B2

(12) United States Patent
Stewart et al.

(10) Patent No.: US 11,869,003 B2
(45) Date of Patent: Jan. 9, 2024

(54) SYSTEM AND METHOD FOR MANAGING A DATA PROCESS IN A VIRTUAL REALITY SETTING

(71) Applicant: ROYAL BANK OF CANADA, Montreal (CA)

(72) Inventors: Austen Thomas Stewart, Montreal (CA); Ankur Bagchi, Montreal (CA); Matthew Frederick Faller, Montreal (CA)

(*) Notice: Subject to any disclaimer, the term of this patent is extended or adjusted under 35 U.S.C. 154(b) by 0 days.

(21) Appl. No.: 16/144,626

(22) Filed: Sep. 27, 2018

(65) Prior Publication Data
US 2019/0095918 A1 Mar. 28, 2019

Related U.S. Application Data

(60) Provisional application No. 62/564,069, filed on Sep. 27, 2017.

(51) Int. Cl.
G06Q 20/40 (2012.01)
G06Q 20/32 (2012.01)
G06T 19/00 (2011.01)
G06F 3/04812 (2022.01)
G06F 3/01 (2006.01)

(52) U.S. Cl.
CPC ......... *G06Q 20/4014* (2013.01); *G06F 3/011* (2013.01); *G06F 3/04812* (2013.01); *G06Q 20/322* (2013.01); *G06T 19/006* (2013.01)

(58) Field of Classification Search
CPC .............. G06Q 20/4014; G06Q 20/322; G06F 3/04812; G06T 19/006
See application file for complete search history.

(56) References Cited

U.S. PATENT DOCUMENTS

| 9,875,600 | B2* | 1/2018 | Arumugam | G07F 17/3237 |
| 9,904,808 | B2* | 2/2018 | Dow | G06F 3/0227 |
| 10,430,558 | B2* | 10/2019 | Breitenfeld | G06F 21/31 |
| 10,482,664 | B1* | 11/2019 | Schlosser | G06Q 20/3224 |
| 11,429,707 | B1* | 8/2022 | Martinez | G06F 3/017 |

(Continued)

*Primary Examiner* — Namrata Boveja
*Assistant Examiner* — William D Newlon
(74) *Attorney, Agent, or Firm* — Norton Rose Fulbright Canada LLP

(57) ABSTRACT

A computer-implemented system and method for managing a data process in a virtual reality setting are provided. The method may include: receiving electronic signals representing a payment instruction from a sender device, the payment instruction associated with a pending transaction; receiving electronic signals representing one or more sender input associated with one or more virtual reality elements of a virtual reality experience template from the sender device; processing the payment instruction and the one or more VR elements to generate a custom virtual reality experience token, the custom virtual reality experience token comprising a condition required to complete the pending transaction; transmitting the custom virtual reality experience token to a recipient device to display a message in a virtual reality setting at the recipient device; receiving electronic signals representing one or more recipient input from the recipient device; and processing the recipient input to determine if the condition is met.

18 Claims, 7 Drawing Sheets

(56) References Cited

U.S. PATENT DOCUMENTS

| | | | |
|---|---|---|---|
| 2012/0038668 A1* | 2/2012 | Kim | G06T 11/60 345/633 |
| 2013/0159196 A1* | 6/2013 | DiZoglio | G06Q 20/20 705/72 |
| 2013/0178257 A1* | 7/2013 | Langseth | A63F 13/23 345/419 |
| 2015/0100637 A1* | 4/2015 | Lakshmegowda | H04L 67/141 709/204 |
| 2018/0091486 A1* | 3/2018 | Liu | G06F 3/005 |
| 2018/0150899 A1* | 5/2018 | Waldron | G06F 3/017 |
| 2018/0158060 A1* | 6/2018 | Adams | H04W 12/06 |
| 2018/0181194 A1* | 6/2018 | Harvey | G06F 3/038 |
| 2018/0181926 A1* | 6/2018 | Jacobs | G06Q 20/10 |
| 2018/0181946 A1* | 6/2018 | Miryala | G06T 19/006 |
| 2020/0051080 A1* | 2/2020 | Maheshwari | G06Q 20/36 |

* cited by examiner

SYSTEM AND METHOD FOR MANAGING A DATA PROCESS IN A VIRTUAL REALITY SETTING

PRIORITY

This application claims the benefit of and priority to U.S. provisional patent application No. 62/564,069 filed on Sep. 27, 2017, the content of which is incorporated by reference in its entirety.

FIELD

This disclosure generally relates to generating, processing, and managing a data process. More particularly, this disclosure relates to managing a data process in a virtual reality setting.

INTRODUCTION

The transfer of funds over data networks such as the Internet by consumers continues to grow at a rapid pace. Reports from financial services ratings agencies have stated that person-to-person electronic transfers of funds have surpassed personal cheque transfers and that the gulf between the popularity of the two methods is steadily increasing.

There are many advantages to consumers in conducting such electronic transfers of funds, such as the low cost and speed of the transactions, increased accessibility as internet-enabled mobile phones become prevalent worldwide, and the security and verifiability of payments. Nonetheless, in many jurisdictions the rate of adoption of all electronic transfers over data networks lags behind peer jurisdictions.

For example, the United States lags behind many comparable European Union, EAS, and ASEAN nations as well as Canada in consumer use of smartphones to send and receive funds. For example, in Poland, the Elixir Express system, launched in 2012, enables inter-bank transfers within seconds. In 2014, Express Elixir processed 940,000 transactions for a total value of PLN 4.2 billion. In Singapore, the Fast and Secure Transfers (FAST), a real-time payments system provided by the Association of Banks in Singapore, allows automatic clearance of electronic payments up to S$50,000 per transaction. In contrast, a 2015 report found that while the number of North American consumers who knew they could transfer funds electronically using mobile phones was increasing, only 1 percent of Americans actually did so.

In addition to the benefits enjoyed by consumers, increased use of electronic transfers of funds over data networks also provides several benefits to financial institutions. For example, deployment of ISO 20022, the standard used by most real-time payments service providers, increases opportunities for data handling and the capture, processing and marketing of consumer analytics. Further, electronic transfers of funds reduce long-term costs for banks in infrastructure, per-transaction costs, and increase reliability, stability, and availability of infrastructure by allowing financial institutions to retire legacy systems.

SUMMARY

In accordance with one aspect, a computer-implemented method for managing a data process in a virtual reality setting is provided. The method may include: receiving electronic signals representing a payment instruction from a sender device, the payment instruction associated with a pending transaction; receiving electronic signals representing one or more sender input associated with one or more virtual reality (VR) elements of a virtual reality experience template from the sender device; processing the payment instruction and the one or more VR elements to generate a custom virtual reality experience token, the custom virtual reality experience token comprising a condition required to complete the pending transaction; transmitting the custom virtual reality experience token to a recipient device to display a message in a virtual reality setting at the recipient device; receiving electronic signals representing one or more recipient input from the recipient device; and processing the recipient input to determine if the condition has been met.

In some embodiments, the method may include when the condition has been met, executing the payment instruction to complete the pending transaction.

In some embodiments, the virtual reality experience may include an augmented virtual reality-based user experience.

In some embodiments, the condition may include one or more action items required from the recipient device.

In some embodiments, the custom virtual reality experience token may include a field representative of the message displayed at the recipient device.

In some embodiments, the message comprises text indicating the condition to be fulfilled by the recipient device.

In some embodiments, the payment instruction may include at least one of: a fund amount, a recipient ID, a sender ID, a message to the recipient ID, an expire date, a currency type, and a payment method.

In some embodiments, the one or more VR elements may include one or more customization selections received from the sender device.

In some embodiments, the customization selections may include one or more augmented reality elements of an augmented reality, the one or more augmented reality elements being indicative of digitally generated content incorporated into the virtual reality experience at the recipient device.

In some embodiments, the one or more VR elements may include at least an interactive element.

In accordance with another aspect, a computer system for managing a data process in a virtual reality setting is provided. The system may include a processor and a non-transitory computer-readable medium having machine readable instructions stored thereon, the instructions, when executed, configures the processor to: receive electronic signals representing a payment instruction from a sender device, the payment instruction associated with a pending transaction; receive electronic signals representing one or more sender input associated with one or more virtual reality (VR) elements of a virtual reality experience template from the sender device; process the payment instruction and the one or more VR elements to generate a custom virtual reality experience token, the custom virtual reality experience token comprising a condition required to complete the pending transaction; transmit the custom virtual reality experience token to a recipient device to display a message in a virtual reality setting at the recipient device; receive electronic signals representing one or more recipient input from the recipient device; and process the recipient input to determine if the condition has been met.

In some embodiments, the processor may be configured to: when the condition has been met, execute the payment instruction to complete the pending transaction.

In some embodiments, the virtual reality experience may include an augmented virtual reality-based user experience.

In some embodiments, the condition may include one or more action items required from the recipient device.

In some embodiments, the custom virtual reality experience token may include a field representative of the message displayed at the recipient device.

In some embodiments, the message comprises text indicating the condition to be fulfilled by the recipient device.

In some embodiments, the payment instruction may include at least one of: a fund amount, a recipient ID, a sender ID, a message to the recipient ID, an expire date, a currency type, and a payment method.

In some embodiments, the one or more VR elements may include one or more customization selections received from the sender device.

In some embodiments, the customization selections may include one or more augmented reality elements of an augmented reality, the one or more augmented reality elements being indicative of digitally generated content incorporated into the virtual reality experience at the recipient device.

In some embodiments, the one or more VR elements may include at least an interactive element.

In accordance with yet another aspect, there is provided a computer-implemented method for augmented and virtual reality token management. The method may comprise comprising: connecting to a payments SDK and receiving a payment instruction from a sender; receiving one or more customization selections of one or more elements of a augmented/virtual reality experience template from the sender, and combining the one or more customization selections to create a custom augmented/virtual reality experience token; and, transmitting the received payment instruction and the custom verification experience token to a memory.

In accordance with an aspect, the method may comprise: receiving the payment instruction and the custom augmented/virtual reality experience token via a recipient device; processing the custom augmented/virtual reality experience token to present the augmented/virtual reality experience at the recipient device; executing the payment instruction based on an interaction input received via the custom augmented/virtual reality experience presented at the recipient device.

In accordance with another aspect, the verification experience may include an augmented/virtual reality-based user verification experience.

In accordance with another aspect, the method includes executing the payment instruction when the interaction input satisfies an augmented/virtual reality verification condition.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the subject matter is also considered to include other remaining combinations of A, B, C, or D, even if not explicitly disclosed. For example, although an example embodiment may include the elements of a one or more computer configured to provide and display augmented reality based custom experiences, while another example includes the elements of a one or more computers configured to provide and display virtual reality based custom experiences, it will be understood that the subject matter hereof comprises both augmented reality and virtual reality based custom experiences.

Gamification refers to the application of typical elements of game playing (e.g., point scoring, rules of play, objective-based rewards systems) to other areas of activity—usually to encourage participation or engagement. Often gamification is employed in order to increase usability and accessibility of complex systems, thus enabling users to make more effective and efficient use of those systems.

Figure 1:
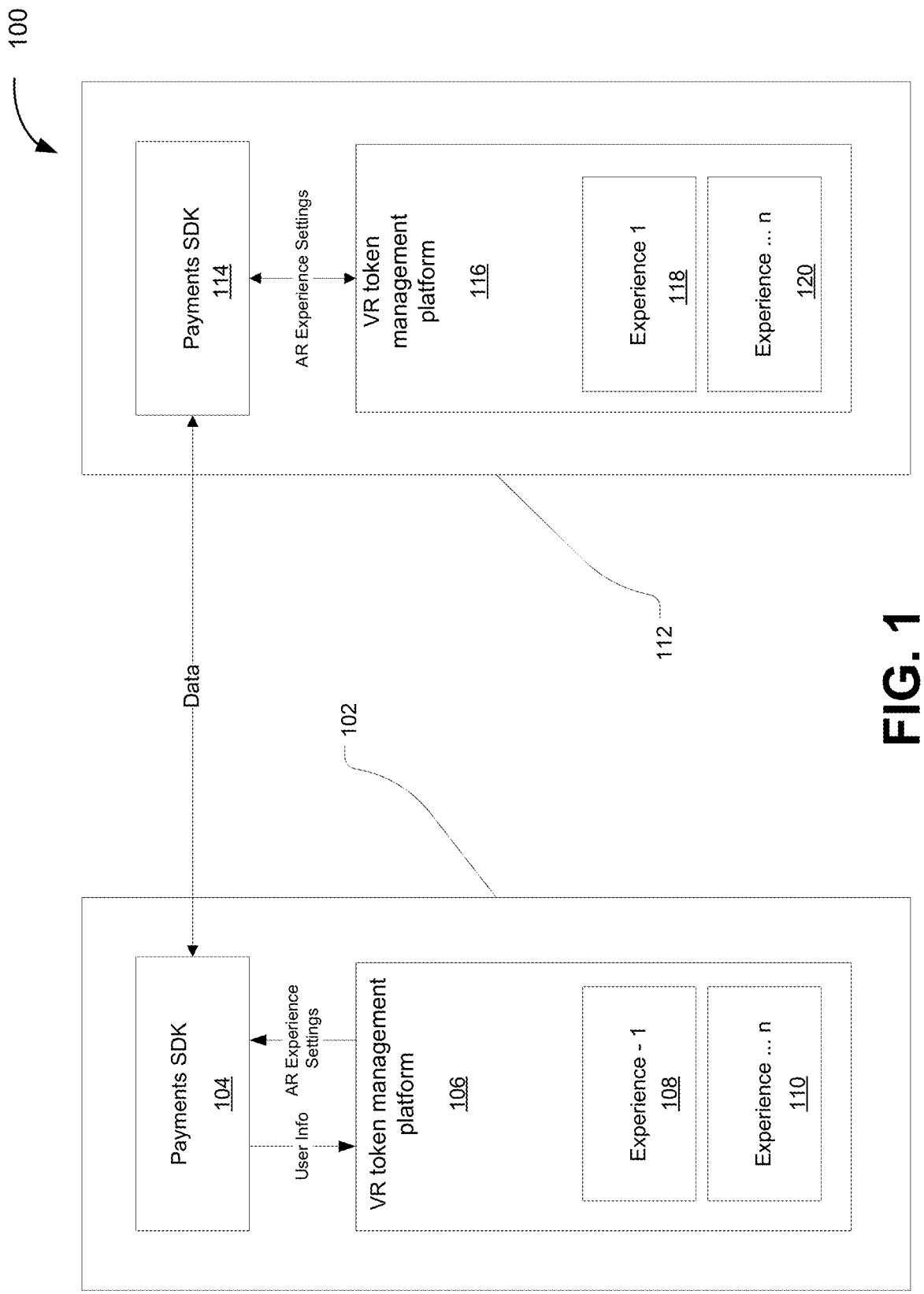
FIG. 1 is a block diagram of an example system for augmented and virtual reality token management, according to some embodiments.

Referring now to FIG. 1, there is provided a block diagram of an example system for augmented and virtual reality token management, according to some embodiments. As depicted, a computing device 102 may contain in a memory thereof a payments processing software development kit (SDK) 104. SDK 104 may function to provide digital payments transmission and receiving capability and may allow users to customize various components of the payments transmission process.

In some embodiments, the payments SDK 104 can be a wallet or other application which manages payment transaction messaging. For example, payments SDK 104 can be a payment processing system that is physically located apart from computing device 102 and connected to platform 106 over a network. In some embodiments the payments SDK interacts with one or more financial institution and/or payment processing systems to send/receive and/or instruct a fund transfer process.

Upon receiving data reflective of various user selections via computing device 102, SDK 104 may transmit user information including, for example, the user selections to a Virtual Reality (VR) token management platform 106.

Throughout the disclosure, Virtual Reality (VR) may represent an interactive setting or environment where computer-generated content is used to simulate and display a virtual reality or virtual world to the user, and may incorporate user feedback. The user feedback may include, for example, auditory, visual or haptic feedback. The virtual reality environment may be two-dimensional or three-dimensional. A user may use a computing device, such as mobile device, to display the virtual reality, and to participate in the virtual reality. A user may also use a headset, if necessary or appropriate, to display the virtual reality, and to participate in the virtual reality. A user may participate in the virtual reality by interacting with one or more virtual items or features within the virtual reality. The virtual items or features may be digitally generated content. A VR environment may be configured to receive one or more user input (e.g. hand movements, head movements, eye movement, or sound) within the environment, and to process the one or more user input concurrently or in real-time.

VR may include Augmented Reality (AR) elements, though AR elements are not necessary for a VR setting. AR may be a type of virtual reality technology that augments or supplements what a user sees in physical world with digital content generated by a computer processor. For example, AR may superimpose computer-generated image onto a user's view of the real world, providing a composite view.

In some embodiments, VR token management platform 106 may include computer instructions functional to provide augmented reality and/or virtual reality-based user experiences 108, 110 (e.g., via the user interface of the computing device 102).

In some embodiments, augmented reality and/or virtual reality-based user experiences 108, 110 may be customizable based on the user information (e.g., user selections received via the computing device 102 and SDK 104 received. Upon receiving user information instructing it to generate a customized augmented reality and/or virtual reality-based user verification experiences 108, 110, VR token management platform 106 may generate a token containing computer readable instructions and/or data which may, when executed and/or processed, enable generation of the particular customized augmented reality and/or virtual reality-based user verification experiences at a second device.

In some embodiments, the VR token management platform 106 operates on the device 104. In other embodiments, the VR token management platform 106 operates at a server. In some embodiments, the functions performed by an VR token management platform 106 may be performed partially at the device 104, and partially at a server which can communicate with the device 104.

In some embodiments, the token identifies an augmented/virtual reality template experience. In some embodiments, the token also identifies or defines a customization of an augmented/virtual reality template experience. In some embodiments, a customization can include a setting such as an environment or a selection and/or arrangement of interactive elements. In some embodiments, a customization can include an interactive element created by the user such as a graffiti drawn in an VR environment.

In some embodiments, the token can be, can include or be included in, and/or can be transmitted in conjunction with another data structure such as a JSON which may store any of the identifiers/customization data described herein.

In some embodiments, VR token management platform 106 may transmit the generated token back to the SDK 104 and may optionally store it on the computing device 102. In some embodiments, the token may identify VR experiences and/or customizations which are stored at a server or on a local device. In some embodiments, the token may define or otherwise include data which can be used to recreate an VR experience and/or customization based on data stored at a server or on a local device, or otherwise.

In some embodiments, the payment SDK can include, interact with or be based on Vouchr™.

SDK 102 may cause computing device 102 to transmit (e.g., via a data network such as the Internet) data to a recipient computing device 112. Data transmitted by computing device 112 may include, for example, user information including payment instructions and conditions (or corresponding tokens), authentication data reflective of a particular user, and/or the token containing instructions and/or data which can be used for generation of the particular customized augmented reality and/or virtual reality-based user verification experiences at the recipient device.

In some embodiments upon receiving data from the device 102, including, for example, payment instructions and conditions and the token, recipient device 112 may cause said data to be transmitted to a payments SDK 114 stored in a memory of the recipient device 112. Payments SDK 114 may be interoperable with payments SDK 104 in that each may be capable of reading and/or executing instructions received from the other. In some embodiments, payments SDK 102 of the device 102 and payments SDK 114 of the recipient device 112 may operate in a peer-to-peer fashion and may or may not require an additional processing system interposed between them.

In some embodiments, payments SDK 114 may transmit the token to VR token management platform 116. VR token management platform 116 may contain instructions executable to produce augmented reality and/or virtual reality-based user verification experiences, one or more of which may correspond to those contained in VR token management platform 106. VR token management platform 116 may process data in the token in order to generate the particular customized augmented reality and/or virtual reality-based user verification experience as selected via device 102. The customized augmented reality and/or virtual reality-based user verification experience may be transmitted via a user interface device of recipient device 112. In some embodiments, VR token management platform 106 and VR token management platform 116 may operate in a peer-to-peer fashion and may not require any additional system interposed between them.

In some embodiments, upon generating and transmitting the customized augmented reality and/or virtual reality-based user verification experience may be transmitted via a user interface device of recipient device 112, VR token management platform 116 may process user input received via recipient device 112. In the event the VR token management system detects that user input received corresponds to the authentication data initially selected via computing device 102, VR token management platform 116 may transmit data to payments SDK 114 instructing payments SDK 114 to execute the payments processing instructions initially received by payments SDK 104.

In some embodiments, the payment instruction can initiate the transfer of an electronic gift card, an electronic funds transfer, a credit card payment, and/or a PayPal™, Apple Pay™, Android Pay™, etc. transfer, or the like.

In some embodiments, the payment instruction can initiate a peer-to-peer payment transaction.

Figure 2:
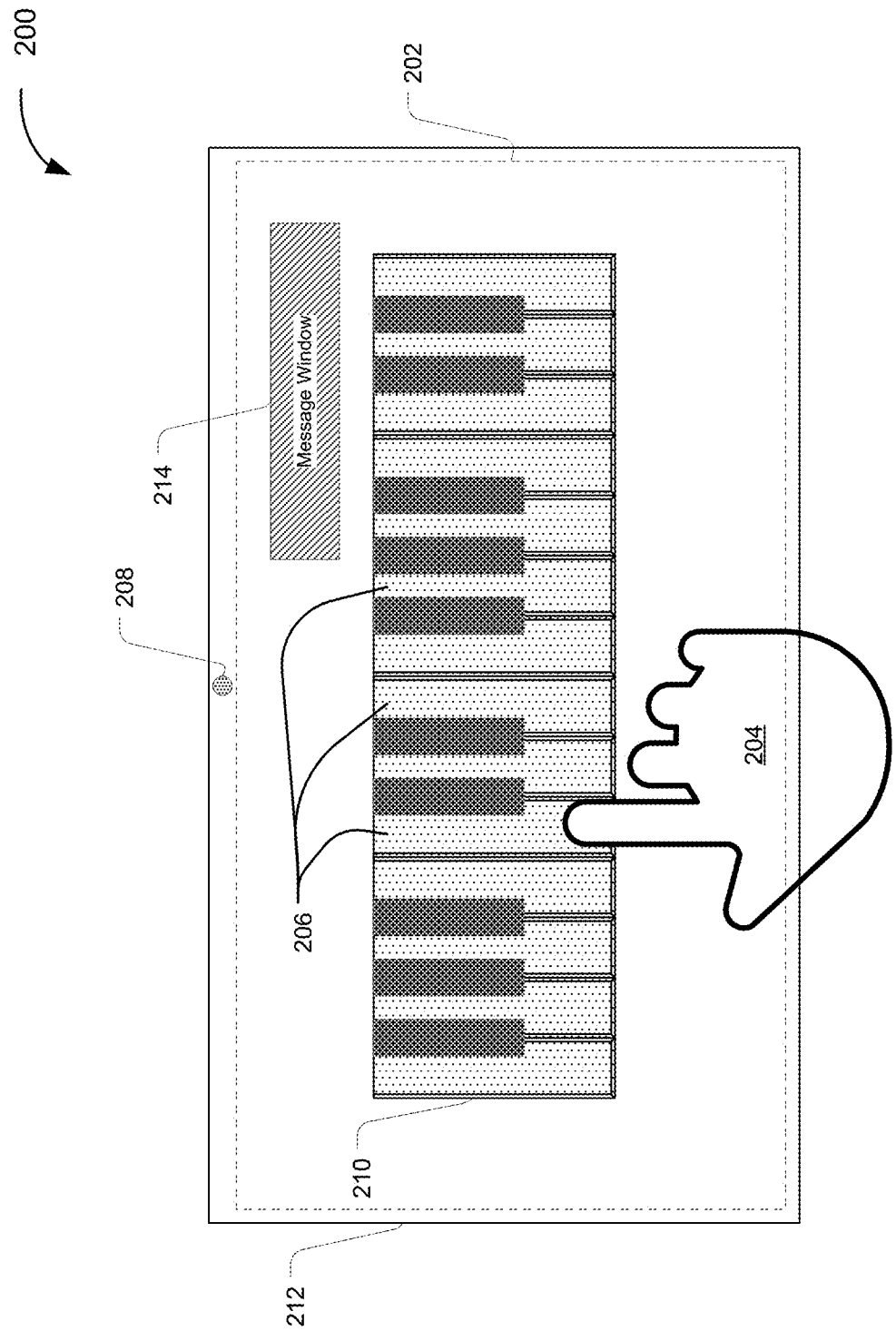
FIG. 2 illustrates an example interface of an example system for augmented and virtual reality token management, according to some embodiments.

Referring now to FIG. 2, there is provided an example interface of an example system for augmented and virtual reality token management, according to some embodiments. The example interface 202 depicted in the figure may be, for example, the multi-touch screen of device 212, which may be, for example, a smartphone or tablet device. Interface 202 may be such an interface on a sender device (e.g., 102 in FIG. 1) or a recipient device (e.g., 112 in FIG. 1). Device 212 may also include one or more sensors 208, which may include for example microphones, cameras, infrared cameras, accelerometers, etc. capable of measuring features of the device 212 and the area surrounding the device 212.

In some embodiments, VR token management platform (e.g., 116 in FIG. 1) may be stored in a memory of device 212 and may contain computer instructions executable to customize and display augmented reality and/or virtual reality-based user verification experiences. AR user interface 210 may be such an augmented reality and/or virtual reality-based user verification experience. In the example embodiment depicted in FIG. 2, instructions in the VR token management platform may be executed by device 212 in order to generate an interactive augmented reality interface (AR Interface 210).

In some embodiments, VR token management platform may contain instructions that, when executed by device 212, cause measurements captured by sensors 208 to be recorded and processed. For example, sensors 208 may include accelerometers, microphones, and cameras functional to detect the orientation of device 212, the ambient sounds in the vicinity of device 212, and light signals representative of the physical area surrounding device 212. Data recorded by sensors 212 may be processed by device 212 according to instructions in the VR token management platform in order to produce, for example, and augmented reality user interface 210.

In some embodiments, VR token management platform may display an AR user interface 210 by combining the components of the AR user interface 210 with data recorded by the sensors 208 in order to produce a composite. For example, as depicted in FIG. 2, AR user interface 210 may be a digital representation of a segment of a piano keyboard. Data recorded by sensors 208 may include visual images captured by a video camera forming part of device 212. Parameters of the data recorded by sensors 208 may be processed to detect features of the physical area around device 212 (e.g., camera input may, when processed, reflect that a flat surface such as a table is shown by camera data). AR user interface 210 may be modified by VR token management platform to conform to certain features of the physical area around device 212 (e.g., the AR user interface 210 may be displayed atop the table).

In some embodiments, AR user interface 210 may be interactive and may, for example, cause sounds to be played via an output device of device 212 in response to a user interacting with various AR user interface elements 206 (e.g., via a multi-touch interface of device 212). VR token management platform may cause AR user interface 210 to display messages (e.g., via message window 214) or to play audio messages via an auditory output of device 212. For example, such instructions may include instructions for user to interact with AR user interface elements 206 in a particular fashion in order to successfully complete the augmented reality and/or virtual reality-based user verification experience. In a non-limiting example, VR token management platform may cause AR user interface 210 to display a message via message window 214 instructing user to play the piano notes comprising the "C" chord. A subset of AR user interface elements 206 may correspond to the required piano notes. When the correct AR user interface elements 206 are activated, the user input received via user interface 202 may cause VR token management platform may determine that the augmented reality and/or virtual reality-based user verification experience has been successfully completed.

In some embodiments, upon successful completion of the augmented reality and/or virtual reality-based user verification experience, the VR token management platform may send instructions to the payments SDK (e.g., SDK 104 in FIG. 1), which may instruction payments SDK that the validation step has been successfully completed and which may cause payments SDK to proceed to the next step of payment processing.

Figure 3:
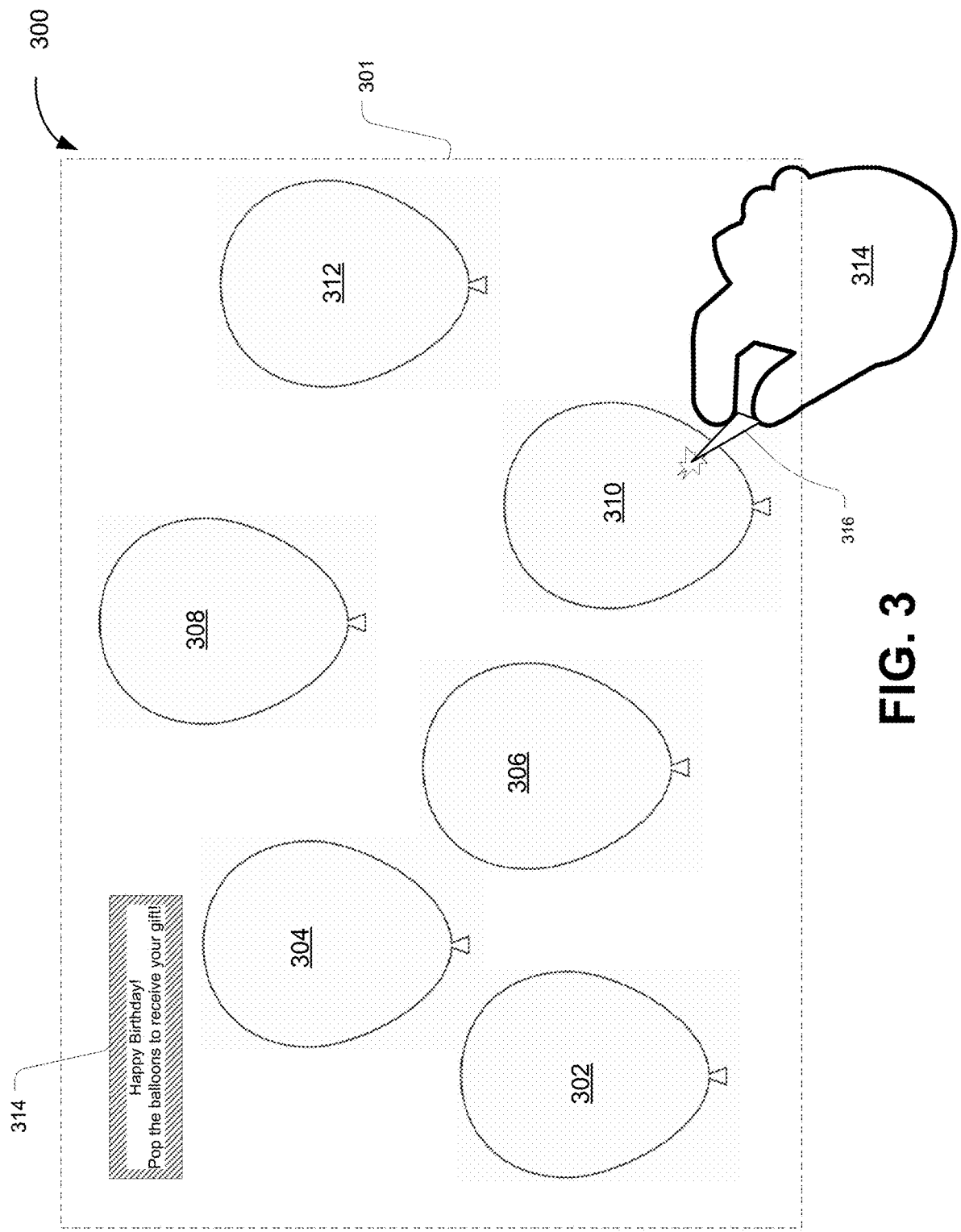
FIG. 3 illustrates an example interface of an example system for augmented and virtual reality token management, according to some embodiments.

Referring now to FIG. 3, there is provided an example interface of an system for augmented and virtual reality token management, according to some embodiments. User interface 301 may be, for example, the screen of a mobile phone or tablet computer device or the user interface of a VR or AR system. The VR token management platform may cause a custom message and/or instruction message to be displayed via user interface 301 (e.g., in a message box 214). The example message displayed in message box 214 includes a greeting as well as instructions for the user to complete the augmented reality and/or virtual reality-based user verification experience.

In some embodiments, the user may be directed to interact with a variety of AR or VR user interface elements (302-312, 316) displayed via the user interface 301 by the VR token management platform. In the example embodiment depicted in FIG. 3, the user interface elements include: a) a digital representation of a pin, which the user can manipulate by tapping or dragging; and b) a number of digital representations of balloons 302-312. When the user causes the "pin" user interface element 316 to overlay a balloon user interface element 302-312, the latter may be depicted as popping and may be removed from the user interface or altered in appearance. Upon completing the required actions as directed, popping all of the balloons 302-312 in this example, the VR token management platform may send instructions to the payments SDK (e.g., SDK 104 in FIG. 1), which may instruction payments SDK that the validation step has been successfully completed and which may cause payments SDK to proceed to the next step of payment processing.

In another example, the experience can be a graffiti display that only appears as an augmented overlay at a particular physical location in the real world.

Figure 4:
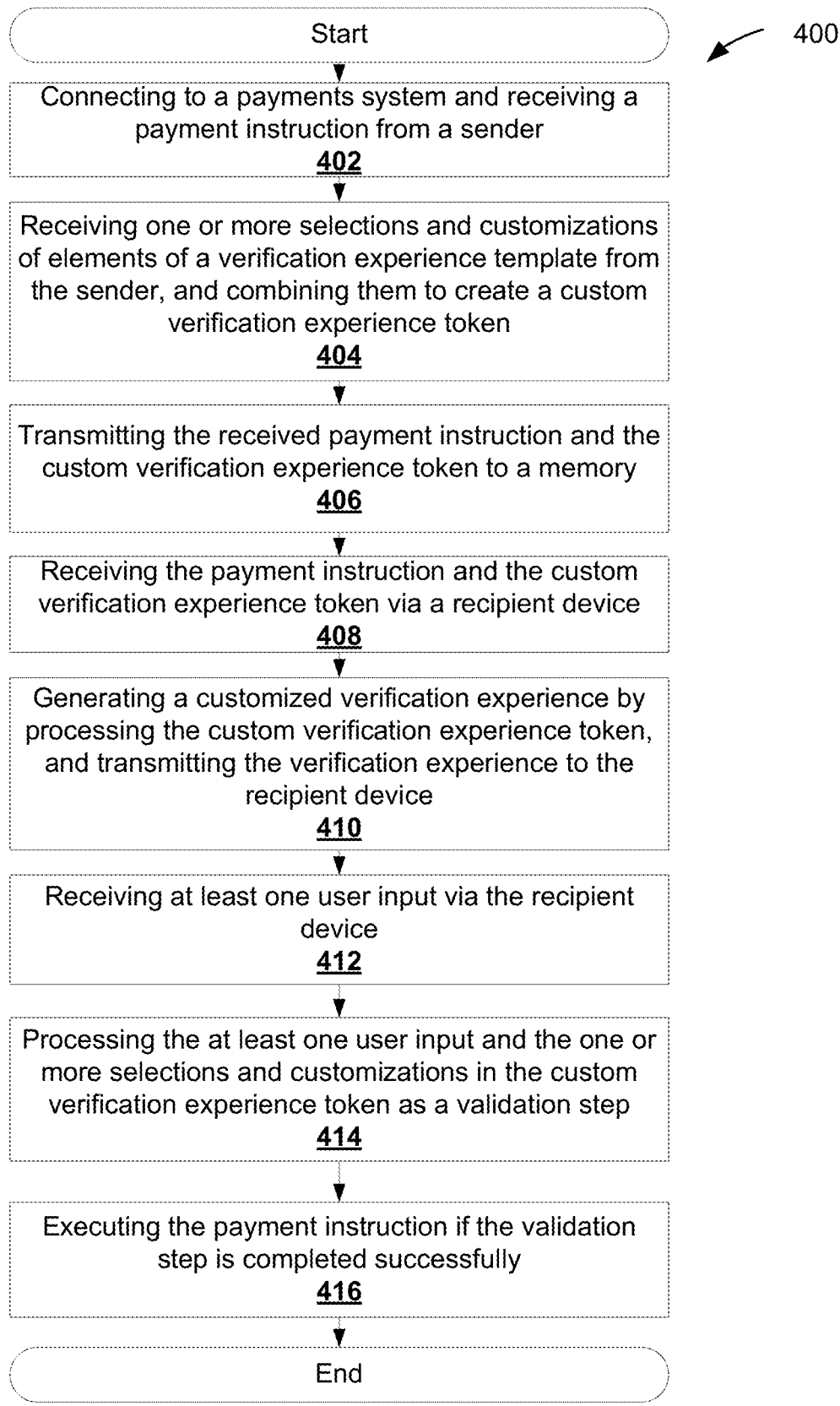
FIG. 4 illustrates an example method for augmented and virtual reality token management, according to some embodiments.

Referring now to FIG. 4, there is provided example method for augmented and virtual reality token management, according to some embodiments. At 402, a computing device connects to a payments system and receives one or more payment instructions from a sender. At 404, one or more selections and customizations of elements of a verification experience template are received from the sender, and are combined to create a custom verification experience token. At 406, the received payment instruction and the custom verification experience token are transmitted to a memory. At 408, the payment instruction and the custom verification experience token are received via a recipient device. At 410, a customized verification experience is generated by processing the custom verification experience token, and the verification experience is transmitted the recipient device. At 412, at least one user input is received via the recipient device. At 414, the at least one user input and the one or more selections and customizations in the custom verification experience token are processed as a validation step. At 416, the payment instruction is executed if the validation step is successfully completed.

In some embodiments, the augmented reality and/or virtual reality-based user verification experience may take the form of a scavenger hunt. For example, an initiator device (e.g., device 102 in FIG. 1) may be used to associate various elements of an experience in an VR token management platform with various geolocation values and visual cues. When the augmented reality and/or virtual reality-based user verification experience is executed by the recipient device (e.g., recipient device 112 in FIG. 1), the VR token management platform on the recipient device may direct the user to bring the device to the particular geolocation associated the elements of the experience.

As a non-limiting example of the embodiment described in the previous paragraph, a department store may organize a scavenger hunt as an augmented reality and/or virtual reality-based user verification experience through which customers may receive discount cards or store credit. A store employee may use an initiator device to associate "gift card" user interface elements of an experience with particular geolocations within the store. The "gift card" user interface elements may be further associated with digital images of the same particular geolocation, which visual images may depict a product display.

In some embodiments, store employee may interact with the initiator device to cause the VR token management platform to send notification of the augmented reality and/or virtual reality-based user verification experience to customers. Upon executing the augmented reality and/or virtual reality-based user verification experience on the customer devices, the VR token management platform may cause instructions to be sent to customers directing them to bring their phone to the particular geolocation. Upon reaching the geolocation, the user interface of the customer devices may display an augmented reality experience which may provide progressive messages (e.g., by providing dynamic directions via a message window on the recipient device) directing the customers to find the "gift card" on the display earlier indicated by the store employee. The user may orient the device so that the device's camera is pointed at the display, in response the "gift card" user interface element upon the camera image of the display as part of the augmented reality and/or virtual reality-based user verification experience to customers. Interacting with the "gift card" user interface element may cause the VR token management platform to send verification to the SDK, which may in turn provide the user with the discount or store credit.

Figure 6:
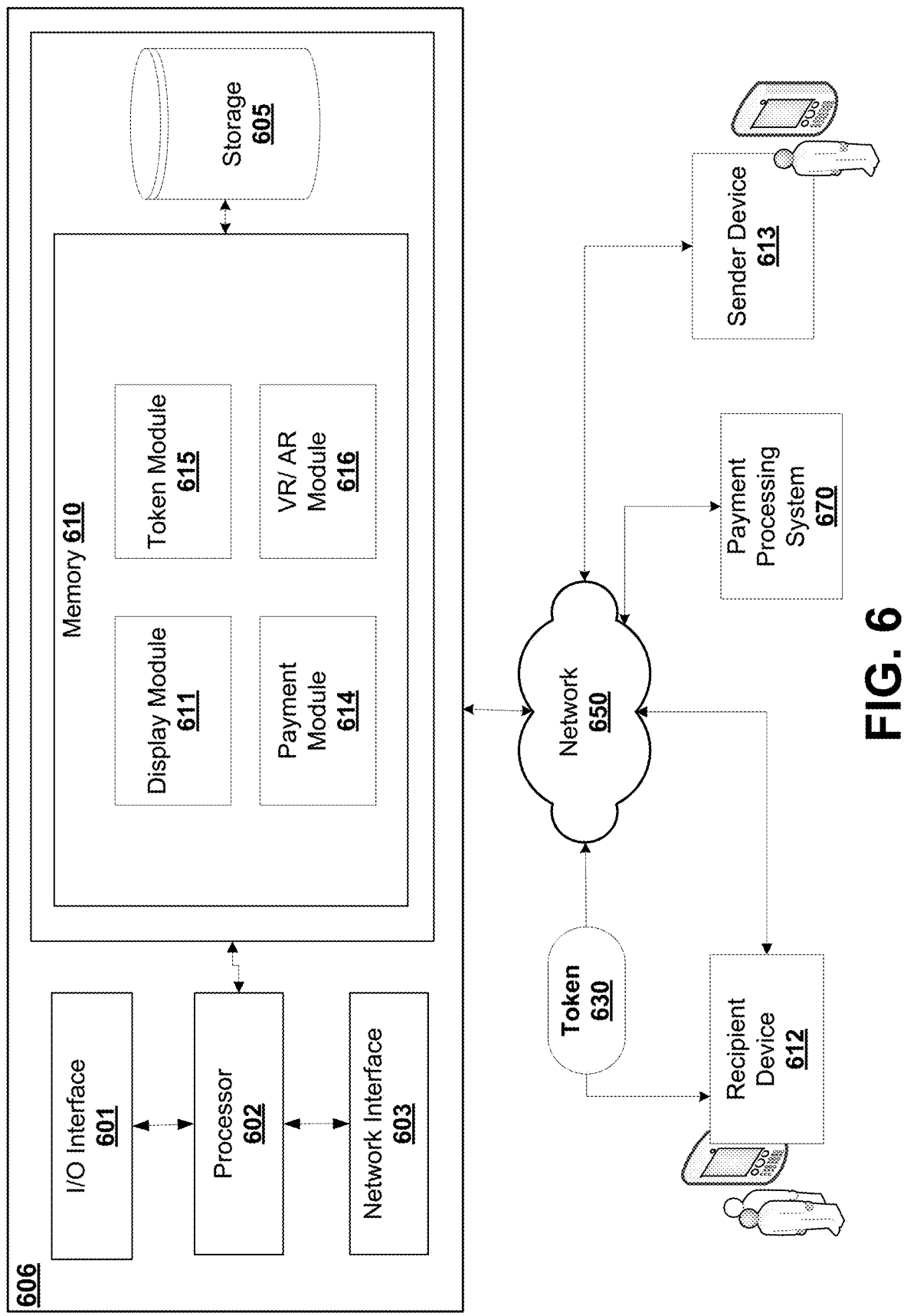
FIG. 6 illustrates an example system for managing a data process in a virtual reality setting, according to some embodiments.

Referring now to FIG. 6, which illustrates an example schematic diagram of a VR token management platform 606 in connection with a payment processing system 670, a recipient device 612 and a sender device 613 over a network 650, in some embodiments.

As depicted, system 606 includes at least one I/O interface 601, at least one processor 602, at least one network interface 603, memory 610, and at least one storage 605. Components of platform 606, such as display module 611, payment module 614, token module 615, and VR/AR module 616, may reside on memory 610. A custom virtual reality experience token 630 may be exchanged between platform 606 and recipient device 612 in order to facilitate a data process within a virtual reality setting.

Each I/O interface 601 enables platform 606 to interconnect with one or more input devices, such as a keyboard, mouse, camera, touch screen and a microphone, or with one or more output devices such as a display screen and a speaker.

Processor 602 may be an Intel or AMD x86 or x64, PowerPC, ARM processor, or the like. Processor 602 may be a microprocessor or microcontroller, a digital signal processing (DSP) processor, an integrated circuit, a field programmable gate array (FPGA), a reconfigurable processor, a programmable read-only memory (PROM), or any combination thereof. The processor 602 may be optimized for graphical rendering of augmented reality or virtual reality visualizations.

Memory 610 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each network interface 603 enables platform 606 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WiMAX), SS27 signaling network, fixed line, local area network, wide area network, and others, including any combination of these.

Platform 606 may include, in some embodiments, a display module 611, a payment module 614, a token module 615, and a VR/AR module 616. Display module 611 may be configured to generate a display command for a recipient device based on token 630, so the recipient device may display a virtual reality environment in accordance with token 630. Payment module 614 may be configured to receive payment instructions from a sender device 613 or from a payment SDK 104, and process the payment instructions to determine a pending transaction based on the payment instructions, as well as one or more conditions, if any, required to complete the pending transaction. The one or more conditions may include, in some embodiments, user actions from a recipient device 612. Token module 615 may be configured to process signals from payment module 614 as well as electronic signals representing one or more sender input associated with one or more virtual reality (VR) elements of a virtual reality experience template from the sender device to generate a token 630. VR/AR module 616 may be configured to retrieve token 630 and to process one or more signals received from recipient device 612 in order to determine if a condition has been fulfilled, in order to determine if a pending transaction can be completed. Once a pending transaction is determined to be completed, signals can be sent to payment processing system 670, which may be part of or separate from platform 606, to complete the payment transaction.

In some embodiments, the one or more virtual reality (VR) elements of a virtual reality experience template may be stored in storage 605. One or more templates may also be stored in memory for retrieving and processing by platform 606 or sender device 613.

Figure 7:
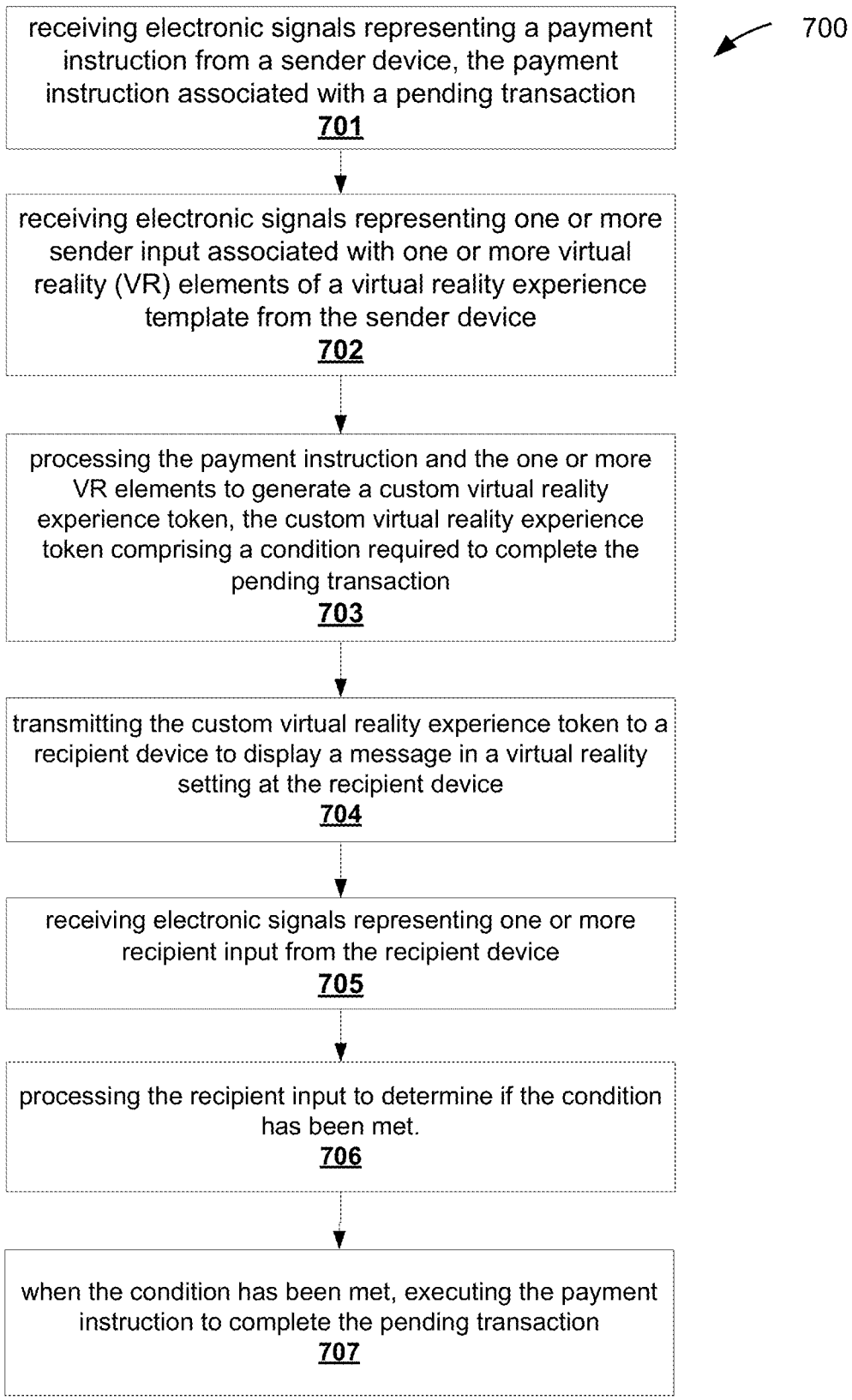
FIG. 7 illustrates an example process for managing a data process in a virtual reality setting, according to some embodiments.

Referring now to FIG. 7, which illustrates an example process 700 performed by VR token management platform 606, in some embodiments. At step 701, platform 606 may receive electronic signals representing a payment instruction from a sender device 613, the payment instruction associated with a pending transaction; at step 702, platform 606 may receive electronic signals representing one or more sender input associated with one or more virtual reality (VR) elements of a virtual reality experience template from the sender device 613; at step 703, platform 606 may process the payment instruction and the one or more VR elements to generate a custom virtual reality experience token 630, the custom virtual reality experience token 630 including a condition required to complete the pending transaction; at step 704, platform 606 may transmit the custom virtual reality experience token 630, over a network 650, to a recipient device 612 to display a message in a virtual reality setting at the recipient device; at step 705, platform 606 may receive electronic signals representing one or more recipient input from the recipient device 612; at step 706, platform 606 may process the recipient input to determine if the condition for complete the pending transaction has been met; and at step 707, if and when the condition has been met, platform 606 may execute the payment instruction to complete the pending transaction, thereby transferring a fund from the sender device 613 to the recipient device 612.

The custom virtual reality experience token 630 may include, in some embodiments, an instance of a pre-defined VR experience class comprising a plurality of sub-classes or fields. For example, an instance of a pre-defined VR experience class may include a sub-class representative of visual, auditory, and/or haptic elements configured to be displayed at a user device in order to present the virtual reality based on the virtual reality experience template and one or more virtual reality (VR) elements of the template. For another example, an instance of a pre-defined VR experience class may include one or more of: a sub-class representative of the pending transaction associated with the payment instruction, a sub-class representative of one or more conditions required to complete the pending transaction, such as one or more user actions required from the recipient device associated with a recipient ID in the payment instruction, and a sub-class representative of a message to be displayed to the recipient device within the virtual reality environment.

In some embodiments, the electronic signals representing one or more recipient input from the recipient device 612 may include signals indicative of a user has interacted with one or more virtual features or items situated within the virtual reality environment.

In some embodiments, the virtual reality experience may include an augmented virtual reality-based user experience, where digitally generated content is superimposed onto a real world view.

In some embodiments, the condition may include one or more action items required from the recipient device 612. For example, the action item may include the recipient user popping a number of balloons within the virtual reality setting and the recipient device 612 transmitting the corresponding user input based on the recipient's actions detected within the virtual reality setting. For another example, the action item may include the recipient user inputting one or more answers to pre-defined questions within the message being displayed on the recipient device 612.

In some embodiments, the custom virtual reality experience token may include a field representative of the message displayed at the recipient device. The message may include a personal message, a breakdown of the pending transaction, and so on, to the intended recipient In some embodiments, the message comprises text indicating the condition to be fulfilled by the recipient device. For example, the message may indicate in order to process the pending transaction associated with a payment, the recipient needs to interact with one or more virtual items or features within the virtual reality, such as popping a number of virtual balloons.

In some embodiments, the payment instruction may include at least one of: a fund amount, a recipient ID, a sender ID, a message to the recipient ID, an expire date, a currency type, and a payment method.

In some embodiments, the one or more VR elements may include one or more customization selections received from the sender device 613. For example, the customization selections may include one or more augmented reality elements of an augmented reality, the one or more augmented reality elements being indicative of digitally generated content incorporated into the virtual reality experience at the recipient device.

In some embodiments, the one or more VR elements may include at least an interactive element. The interactive element may indicate one or more virtual features or items (e.g. virtual balloons) with which a user (e.g. through a recipient device) may interact.

Figure 5:
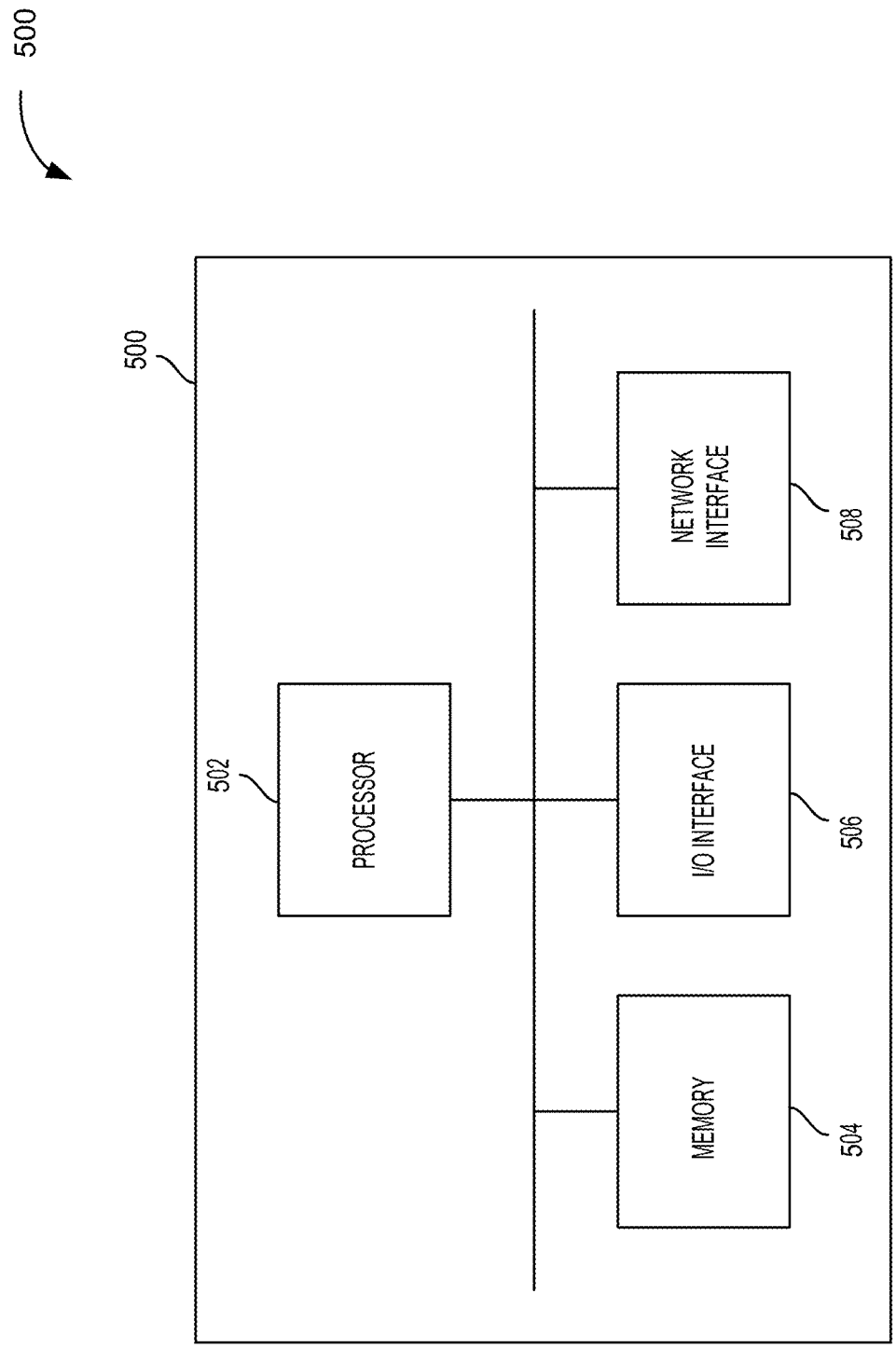
FIG. 5 is a schematic diagram of a computing device.

FIG. 5 is a schematic diagram of computing device 500, exemplary of an embodiment. As depicted, computing device 500 includes at least one processor 502, memory 504, at least one I/O interface 506, and at least one network interface 508. The computing device 500 is configured as a tool for assessing data visualizations.

Each processor 502 may be a microprocessor or microcontroller, a digital signal processing (DSP) processor, an integrated circuit, a field programmable gate array (FPGA), a reconfigurable processor, a programmable read-only memory (PROM), or any combination thereof. The processor 502 may be optimized for graphical rendering of augmented reality or virtual reality visualizations.

Memory 504 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 506 enables computing device 500 to interconnect with one or more input devices, such as a keyboard, mouse, camera, touch screen and a microphone, or with one or more output devices such as a display screen and a speaker. I/O interface 506 may also include application programming interfaces (APIs) which are configured to receive data sets in the form of information signals, including object recognition data and 3-dimensional movement coordinates and translations thereof.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others. Network interface 508, for example, may be used to communicate the information signals, including augmented reality or virtual reality visualizations, coordinates and representations of 3 dimensional objects, as well as object or gesture recognition data.

In some embodiments, one or more aspects of the system can be configured to detect whether the recipient device is capable of presenting the VR experience. If not, one or more aspects of the system can be configured to present a fallback experience/message at the recipient device.

In some embodiments, one or more aspects of the system can be configured to detect the environment around the recipient device to present the customized VR experience. For example, if the sender device is proximate to a table which is used as part of the VR experience being created/customized by the sender, one or more aspects of the system can be configured to apply the VR to any flat plane at the sender device so that the experience can be presented irrespective of the recipient device's environment.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the discussion herein, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

As can be understood, the examples described above and illustrated are intended to be exemplary only.

What is claimed is:

1. A computer-implemented method for managing a data process in a virtual reality setting, the method comprising:
   receiving electronic signals representing data for a pending electronic payment transaction associated with a sender identifier and a recipient identifier;
   receiving, by a remote sender device associated with the sender identifier, electronic signals representing:
      data identifying an arrangement of interactive elements around the remote sender device, said data obtained by a sensor device associated with the remote sender device; and
      one or more user input associated with one or more virtual reality (VR) elements of a virtual reality experience template to be associated with the pending electronic payment transaction, wherein the virtual reality experience template defines digitally generated content associated with the arrangement of interactive elements around the remote sender device, and wherein the one or more user input comprises at least one user selection for customizations of the arrangement of interactive elements to be applied to the virtual reality experience template;
   based on the data for the pending electronic payment transaction, the data identifying the arrangement of interactive elements around the remote sender device, and the one or more VR elements:
  generating a custom virtual reality experience token based in part on the at least one user selection for the customizations of the arrangement of interactive elements, the custom virtual reality experience token comprising data identifying the virtual reality experience template, the customizations of the arrangement of interactive elements to be applied to the virtual reality experience template, and a condition required to complete the pending electronic payment transaction,
  wherein said customizations define how the digitally generated content of the arrangement of interactive elements around the remote sender device is to be superimposed on a display view of a recipient device associated with the recipient identifier; and
  transmitting, from the remote sender device, the custom virtual reality experience token to the recipient device associated with the pending electronic payment transaction, the custom virtual reality experience token useable by the recipient device to access or generate a customized virtual reality experience token based on the virtual reality experience template identified by the custom virtual reality experience token and customized by the customizations of the arrangement of interactive elements, said customizations generated based on the at least one user selection received by the remote sender devices; and
  upon receiving electronic signals representing one or more inputs at the recipient device which result in satisfaction of the condition, generating signals to trigger a data process for executing the pending electronic payment transaction.

2. The method of claim 1, wherein the customized virtual reality experience template comprises an augmented virtual reality-based user experience.

3. The method of claim 1, wherein the condition comprises one or more action items required from the recipient device.

4. The method of claim 1, wherein the custom virtual reality experience token comprises a field representative of a message to be presented at the recipient device.

5. The method of claim 1, wherein the data for the pending electronic payment transaction comprises at least one of: a fund amount, the recipient identifier, the sender identifier, an expire date, a currency type, or a payment method.

6. The method of claim 1, wherein the one or more VR elements comprises one or more customization selections received from the remote sender device.

7. The method of claim 6, wherein the customization selections comprises one or more augmented reality elements of an augmented reality, the one or more augmented reality elements being indicative of digitally generated content incorporated into the virtual reality experience template at the recipient device.

8. The method of claim 4, wherein the message comprises text indicating the condition to be fulfilled at the recipient device.

9. The method of claim 1, wherein the one or more VR elements comprises one or more customization selections received from the recipient device.

10. A computer system for managing a data process in a virtual reality setting, the system comprising a processor and a non-transitory computer-readable medium having machine readable instructions stored thereon, the instructions, when executed, configures the processor to:
  receive electronic signals representing data for a pending electronic payment transaction associated with a sender identifier and a recipient identifier;
  receive, by a remote sender device associated with the sender identifier, electronic signals representing:
    data identifying an arrangement of interactive elements around the remote sender device, said data obtained by a sensor device associated with the remote sender device; and
    one or more user input associated with one or more virtual reality (VR) elements of a virtual reality experience template to be associated with the pending electronic payment transaction, wherein the virtual reality experience template defines digitally generated content associated with the arrangement of interactive elements around the remote sender device, and wherein the one or more user input comprises at least one user selection for customizations of the arrangement of interactive elements to be applied to the virtual reality experience template;
  based on the data for the pending electronic payment transaction, the data identifying the arrangement of interactive elements around the remote sender device, and the one or more VR elements:
    generate a custom virtual reality experience token based in part on the at least one user selection for the customizations of the arrangement of interactive elements, the custom virtual reality experience token comprising data identifying the virtual reality experience template, the customizations of the arrangement of interactive elements to be applied to the virtual reality experience template, and a condition required to complete the pending electronic payment transaction,
    wherein said customizations define how the digitally generated content of the arrangement of interactive elements around the remote sender device is to be superimposed on a display view of a recipient device associated with the recipient identifier; and
    transmit, from the remote sender device, the custom virtual reality experience token to the recipient device that is associated with the pending electronic payment transaction, the custom virtual reality experience token useable by the recipient device to access or generate a customized virtual reality experience template based on the virtual reality experience template identified by the custom virtual reality experience token and customized by the customizations of the arrangement of interactive elements, said customizations generated based on the at least one user selection received by the remote sender device; and
  upon receiving electronic signals representing one or more inputs at the recipient device which result in satisfaction of the condition, generating signals to trigger a data process for executing the pending electronic payment transaction.

11. The system of claim 10, wherein the customized virtual reality experience template comprises an augmented virtual reality-based user experience.

12. The system of claim 10, wherein the condition comprises one or more action items required from the recipient device.

13. The system of claim 10, wherein the custom virtual reality experience token comprises a field representative of a message to be presented at the recipient device.

14. The system of claim 10, wherein the data for the pending electronic payment transaction comprises at least one of: a fund amount, the recipient identifier, the sender identifier, an expire date, a currency type, or a payment method.

15. The system of claim 10, wherein the one or more VR elements comprises one or more customization selections received from the recipient device.

16. The system of claim 15, wherein the customization selections comprises one or more augmented reality elements of an augmented reality, the one or more augmented reality elements being indicative of digitally generated content incorporated into the virtual reality experience template at the recipient device.

17. The system of claim 13, wherein the message comprises text indicating the condition to be fulfilled by the recipient device.

18. The system of claim 10, wherein the one or more VR elements comprises one or more customization selections received from the remote sender device.

* * * * *